(12) United States Patent
Dwyer et al.

(10) Patent No.: US 11,831,658 B2
(45) Date of Patent: Nov. 28, 2023

(54) ENDPOINT SECURITY ARCHITECTURE WITH PROGRAMMABLE LOGIC ENGINE

(71) Applicant: Nuix Limited, Sydney (AU)

(72) Inventors: John Dwyer, Hampstead, MD (US); Benjamin McNichols, West Friendship, MD (US); Martin Pillion, Rancho Cordova, CA (US); Kevin Wenchel, Marriottsville, MD (US)

(73) Assignee: Nuix Limited, Sydney (AU)

( * ) Notice: Subject to any disclaimer, the term of this patent is extended or adjusted under 35 U.S.C. 154(b) by 0 days.

(21) Appl. No.: 16/245,770

(22) Filed: Jan. 11, 2019

(65) Prior Publication Data

US 2019/0230100 A1 Jul. 25, 2019

Related U.S. Application Data

(60) Provisional application No. 62/620,110, filed on Jan. 22, 2018.

(51) Int. Cl.
*H04L 29/00* (2006.01)
*H04L 9/40* (2022.01)
*H04L 41/046* (2022.01)

(52) U.S. Cl.
CPC ........ *H04L 63/1416* (2013.01); *H04L 41/046* (2013.01); *H04L 63/0263* (2013.01); *H04L 63/20* (2013.01)

(58) Field of Classification Search
CPC .............. H04L 63/1416; H04L 41/046; H04L 63/0263
USPC .......................................................... 726/22
See application file for complete search history.

(56) References Cited

U.S. PATENT DOCUMENTS

| | | | |
|---|---|---|---|
| 6,779,120 B1 | 8/2004 | Valente et al. | |
| 7,463,590 B2 * | 12/2008 | Mualem | H04L 63/1458 370/241 |
| 7,793,338 B1 | 9/2010 | Beddoe et al. | |
| 7,882,538 B1 | 2/2011 | Palmer | |
| 8,032,940 B1 * | 10/2011 | Dhanani | G06F 21/6218 726/26 |
| 8,910,238 B2 | 12/2014 | Lukacs et al. | |

(Continued)

OTHER PUBLICATIONS

United States Patent and Trademark Office, Office Action for U.S. Appl. No. 16/673,121, dated Mar. 25, 2020 (21 pages).

(Continued)

*Primary Examiner* — Jeffrey C Pwu
*Assistant Examiner* — Michael D Anderson
(74) *Attorney, Agent, or Firm* — Nutter McClennen & Fish LLP (57) ABSTRACT

The present invention provides an integrated, context-aware, security system that provides an adaptive endpoint security agent architecture model for a continuously monitoring and recording activity across an enterprise, specifically monitoring activity on endpoints, and subsequently detecting and blocking any malicious processes that may otherwise invade the enterprise and cause issues. The endpoint security agent architecture exposes a well-defined, public interface to the event data generated by the endpoint security agent in the form of a custom programming language by which a user can define the logic that the endpoint security agent executes in response to event data to perform detection of and response to suspicious activity.

20 Claims, 8 Drawing Sheets

(56) References Cited

U.S. PATENT DOCUMENTS

| | | | |
|---|---|---|---|
| 8,955,105 | B2 | 2/2015 | Hudis et al. |
| 9,092,616 | B2* | 7/2015 | Kumar ................. G06F 21/52 |
| 9,104,864 | B2 | 8/2015 | Penton et al. |
| 9,602,536 | B1 | 3/2017 | Brown, Jr. et al. |
| 2012/0066759 | A1 | 3/2012 | Chen et al. |
| 2015/0373043 | A1 | 12/2015 | Wang et al. |
| 2016/0191550 | A1 | 6/2016 | Ismael et al. |
| 2016/0308898 | A1 | 10/2016 | Teeple et al. |
| 2016/0344773 | A1 | 11/2016 | Knjazihhin et al. |
| 2017/0063898 | A1 | 3/2017 | Muddu et al. |
| 2017/0063905 | A1 | 3/2017 | Muddu et al. |
| 2020/0067951 | A1 | 2/2020 | Dwyer et al. |

OTHER PUBLICATIONS

United States Patent and Trademark Office, Response to Nonfinal Office Action for U.S. Appl. No. 16/673,121, dated Sep. 17, 2020 (11 pages).

United States Patent and Trademark Office, Final Rejection for U.S. Appl. No. 16/673,121, dated Oct. 9, 2020 (27 pages).

United States Patent and Trademark Office, Appeal Brief for U.S. Appl. No. 16/673,121, dated Mar. 11, 2021 (23 pages).

United States Patent and Trademark Office, Examiner's Answer to Appeal Brief for U.S. Appl. No. 16/673,121, dated Jun. 3, 2021 (23 pages).

United States Patent and Trademark Office, Reply Brief for U.S. Appl. No. 16/673,121, dated Aug. 3, 2021 (21 pages).

\* cited by examiner

```
rulegroup FileWrites
{

# Watch for updates to the hosts file

alert when file.event == FILE_WRITE and stristr(file.path, "system32\drivers\etc\hosts");

} rulegroup SuspiciousProcesses
{ alert on execution of processes whose executables don't have a valid signature and where the
entropy of the executable exceeds 7.8 or the linker time stamp of the executable is less than 3 days

alert when process.state == PROCESS_STARTING and
          curproc.exe.sig == SIG_STATUS_INVALID or
          (curproc.exe.entropy.pe > 7.8 or curproc.exe.peagedays < 3);

# block execution of unsigned executables from temp directories

block [learning] when process.state == PROCESS_STARTING and curproc.exe.sig != SIG_STATUS_VALID
and stristr(process.path,"\temp\");

} rulegroup FilterDBR
{ forward these event types in real time to the server

forward when eventtype.process;
forward when eventtype.file;
forward when eventtype.network;

```
rulegroup RemovableMediaActivity
{
    # store the device paths for the last 64 removable media devices that were inserted
    persist global string gRemovableMediaDevice[64];

# add remmove device paths to gRemovableMediaDevices as media is inserted/removed
    set { setinsert(gRemovableMediaDevices, lower(media.devicePath));} when media.event == DEVICE_INSERTED;
    set { setremove(gRemovableMediaDevices, lower(media.devicePath));} when media.event == DEVICE_REMOVED;

# alert when files are written to removable media devices
    alert when file.event == FILE_WRITE and gRemovableMediaDevices contains lower(file.devicepath);

# block execution of files from removable media that are not signed
    block when process.state != PROCESS_EXITED and
              curproc.exe.sig != SIG_STATUS_VALID and
              gRemovableMediaDevices contains lower(process.devicepath);

```
rulegroup TaintedProgramTracking
{
   persist local bool tainted = false;

global string g_shells[] = { "cmd.exe",
                    "cscript.exe",
                    "wscript.exe",
                    "mshta.exe",
                    "powershell.exe"};

global string g_taintedPrograms[] = {
                    "winword.exe",
                    "excel.exe",
                    "powerpnt.exe",
                    "outlook.exe",
                    "acrord32.exe",
                    "firefox.exe",
                    "iexplore.exe"};

# mark programs in g_taintedPrograms as tainted when they start

set {
   tainted = TRUE;
} when ((process.state == PROCESS_STARTING II process.state == PROCESS_EXISTING) &&
     g_taintedPrograms contains lower(getbasename(process.path)));

# propagate the taint flag to child processes of tainted programs when they start
set {
   tainted = TRUE;
} when ((process.state == PROCESS_STARTING II process.state == PROCESS_EXISTING) &&
     context[process.ppid, tainted] == TRUE);

# Block a process previously marked as tainted from attempting to spawn a shell program

block when (tainted == TRUE) && (g_shells contains lower(getbasename(process.path)));
}
```

ENDPOINT SECURITY ARCHITECTURE WITH PROGRAMMABLE LOGIC ENGINE

CROSS-REFERENCE TO RELATED APPLICATIONS

This application claims the benefit of, and priority to, U.S. Provisional Patent Application No. 62/620,110, filed Jan. 22, 2018, the content of which is incorporated by reference herein in its entirety.

FIELD OF THE INVENTION

The present disclosure relates generally to information security, and, more particularly, to an integrated, context-aware, security platform that provides an adaptive endpoint security agent architecture model for detection of malicious activity on one or more endpoint computing devices.

BACKGROUND

Information security is the practice of defending information from unauthorized access, use, disclosure, disruption, modification, perusal, inspection, recording, or destruction. The breadth and depth of information security threats is increasing exponentially, particularly as individuals, organized crime, nation states, as well as hactivist groups continue to realize monetary and promotional gain from attacks on cyber infrastructure. Accordingly, enterprises such as business entities, companies, organizations, government agencies, and the like, must take action to protect their operations, systems, data, and the data of their partners and customers from such threats. To be successful, these actions must provide the broadest possible reach across the enterprise's environment and cross many different types of functions and facets of operations. This is necessary to mitigate gaps and address physical, technological, and procedural elements of the enterprise's security posture. An enterprise's security measures are only as effective as its weakest link Many enterprises will utilize some form of a security management system to protect their confidential and valuable information. Current security management systems may provide specific security components with specific functions, including, for example, endpoint protection. Security systems focusing on endpoint protection typically rely on endpoint security software programmed to collect information about activity occurring on a computer. It is generally understood that, the greater the breadth and depth of data collected, the greater the potential insight that can be derived to assist in detection of malicious activity. Thus, data collected by endpoint security software is processed and analyzed in order to derive value from it.

The analysis of endpoint data can occur either on the specific endpoint that generated the data (i.e., the specific computer being monitored with the endpoint security software) or the endpoint data can be analyzed at a different endpoint in the system, such as, for example, an endpoint server, as opposed to the specific endpoint computer. Because both of these approaches for analyzing endpoint data have merit, a hybrid of these two extremes may be employed. For example, the analysis of data outside the endpoint has particular advantages in that such analysis can operate on massive amounts of data collected from many different endpoints and thereby employ statistical methods to spot trends and anomalies across a large data set. The analysis of data on the endpoint itself has particular advantages in that such analysis provides the ability to detect malicious activity and take responsive action in real-time or near real-time to block or mitigate a threat on that endpoint. Such analysis further provides the ability to intelligently filter the data at the time it is generated on the endpoint in order to reduce the volume of data that may eventually be transmitted outside of the endpoint for storage or further analysis.

While some information security systems offer endpoint protection configured to perform data analysis on the endpoint itself, such systems have drawbacks. For example, in such systems, the analysis of the data on the endpoint, as well as the action taken in response to the analysis, is heavily constrained as a result of the proprietary logic incorporated into endpoint software used by current systems. More specifically, the endpoint software on current systems may employ a combination of technologies such as, for example, predictive models built into the source code of the endpoint software, hard-coded logic rules written directly into the source code of the endpoint software, and/or proprietary logic in the form of rules or signatures delivered periodically by the vendor to the customer which are loaded into the endpoint software. Current endpoint protection systems are limited to allowing only the vendor to create and apply custom detection and response logic. Accordingly, such systems lack the ability to allow security experts or analysts, who may be tasked with deploying and managing the endpoint security software in the field, to add to or adapt the detection and response logic that occurs on the endpoint. In turn, customers are at the mercy of the vendor and thus the endpoint protection may be inadequate for a particular organization's information security needs.

SUMMARY

The present invention provides an integrated, context-aware, security system that provides an adaptive endpoint security agent architecture model for continuously monitoring and recording activity across an enterprise, specifically monitoring activity on endpoints, and subsequently detecting and blocking any malicious processes that may otherwise invade the enterprise and cause issues. The endpoint security agent architecture exposes a well-defined, public interface to the event data generated by the endpoint security agent in the form of a custom programming language by which a user can define the logic that the endpoint security agent executes in response to event data to perform detection of and response to suspicious activity.

At the core of this invention is the ability provided to end consumers to quickly customize the logic employed to detect and respond to threats on the endpoint. In particular, end users can use the security platform to model organizational security policies, specific investigative needs, and ever changing threat intelligence. Accordingly, the security platform provides a highly adaptable endpoint protection solution that will provide organizations with the ability to adopt the solution to their needs so as to more quickly and accurately detect, investigate, and respond to threats from malicious code and malicious insiders.

The adaptive security architecture includes an endpoint agent that is deployed to endpoint devices within a network and is configured to communicate over a network with one or more endpoint servers. The endpoint agent is configured to continuously monitor and record activity across the enterprise. In particular, the endpoint agent may include various collection modules configured to monitor activities of processes and users on the endpoint system in real time, or near-real time, through a range of kernel mode and user mode information sources. During monitoring, the collection modules are configured to generate events and deliver such events to a Logic Engine (LE). In turn, the LE is configured to execute logic rules against each event it receives, wherein the rules executed by the LE are written using a custom, declarative programming language known as Event Filtering Language (EFL). The EFL may include a programming language using a process state database to provide per-process symbol tables for the lookup and storage of variables declared in a compiled rule set and is further able to have the values of those variables optionally persist across rule set reload operations.

An endpoint server may provide a graphical user interface (GUI) with an integrated development environment (IDE) allowing for a user (i.e., security expert or analysts, or other user tasked with managing enterprise security) to write and compile EFL rules. In turn, a compiled rule set can be embedded into an installer executable for the endpoint agent, such that, when that installer is used to install an agent, the rules will be loaded into the LE of that agent. In addition, compiled rule sets can be pushed out from the endpoint server over the network to existing endpoint agent installations thereby allowing the rule sets in use on endpoint agents to be updated at any time after initial installation. Accordingly, the LE allows for users to customize and program rules/policies on-the-fly for controlling functionality of security at a given endpoint (i.e., rules/policies can be loaded at the endpoint).

Accordingly, the present invention provides numerous advantages over current systems. In particular, the present invention provides an alternative approach wherein the endpoint security software exposes well-defined, highly structured data on the endpoint and exposes a well-defined, high level programming interface that can be used to manipulate the endpoint data in real time, or near-real time, on the endpoint. The present invention allows for security experts or analysts in the field to develop their own detection and response logic to operate on the endpoint to improve security detection particular to their organization. For example, the adaptive endpoint security agent architecture model allows analysts in the field to develop logic to address new emerging threats and techniques as soon as they are encountered, address threats unique to a particular customer environment, address security policies or business practices unique to a particular customer organization, aid in specific investigations and incident response efforts, and filter out data collected on the endpoint that may have low evidentiary value in order to reduce the amount of data transmitted outside of the endpoint for storage or further analysis. In short, the present invention allows for analysts to expand the effectiveness of the endpoint security software by developing detection and response logic that makes use of the data collected by the endpoint in ways not conceived of by the vendor of the endpoint security software.

In one aspect, the present invention provides a system for

BRIEF DESCRIPTION OF THE DRAWINGS

Features and advantages of the claimed subject matter will be apparent from the following detailed description of embodiments consistent therewith, which description should be considered with reference to the accompanying drawings.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention provides a system that provides an adaptive endpoint security agent architecture model for a continuously monitoring and recording activity across an enterprise, specifically monitoring activity on endpoint devices in an organization and subsequently detecting and blocking any malicious processes that may otherwise invade the enterprise and cause issues. The endpoint security agent architecture exposes a well-defined, public interface to the event data generated by the endpoint security agent in the form of a custom programming language by which a user can define the logic that the endpoint security agent executes in response to event data to perform detection of and response to suspicious activity.

As will be described in greater detail herein, at the core of this invention is the ability provided to end consumers of this security platform to quickly customize the logic employed to detect and respond to threats on the endpoint to model organizational security policies, specific investigative needs, and ever changing threat intelligence. Accordingly, the security platform provides a highly adaptable endpoint protection solution that will provide organizations with the ability to customize the solution to their needs so as to more quickly and accurately detect, investigate, and respond to threats from malicious code and malicious insider threats.

Figure 1:
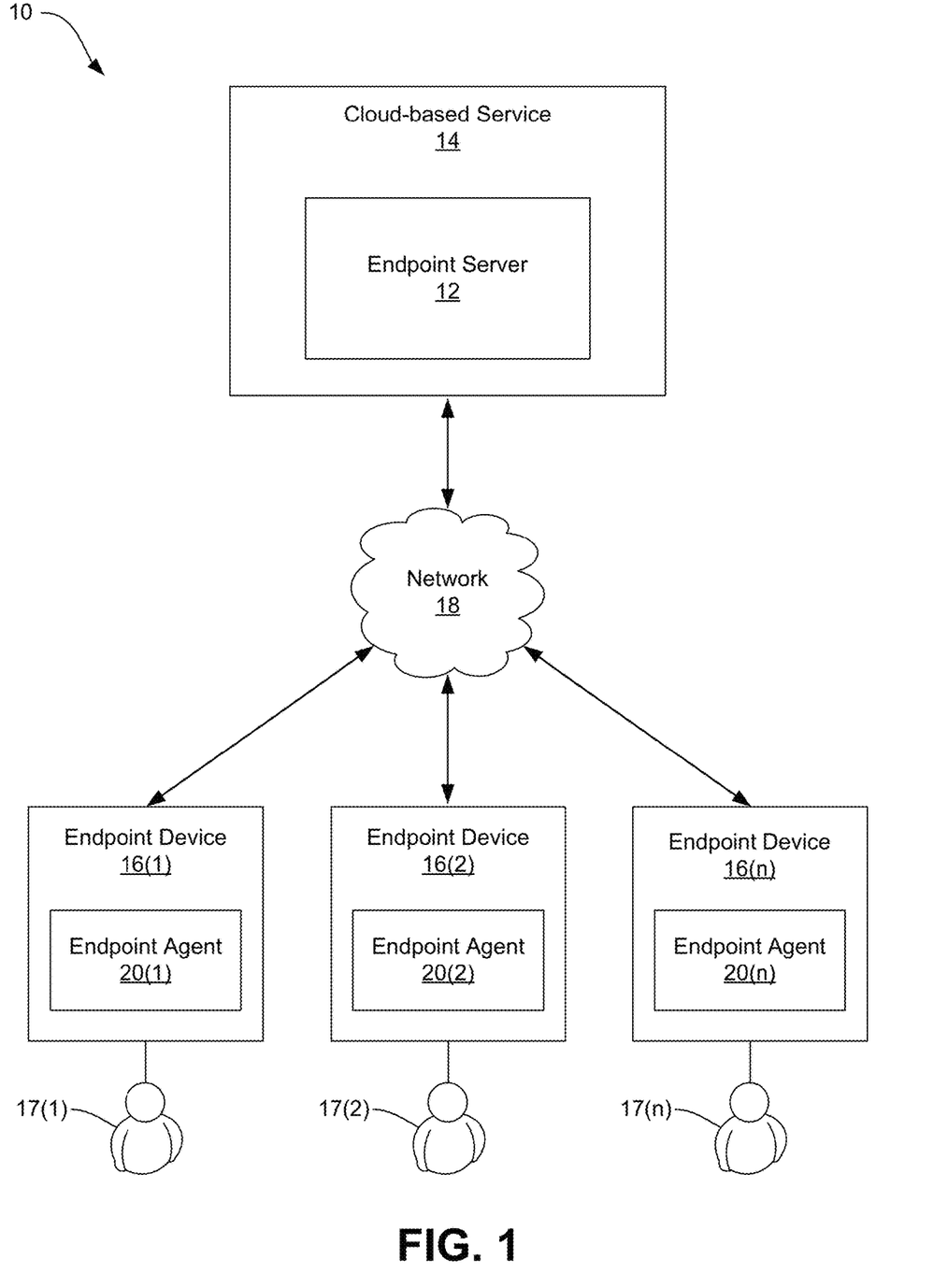
FIG. 1 is a block diagram illustrating one embodiment of an exemplary system for providing and integrated, context-aware, security platform that provides an adaptive endpoint security agent architecture model for detection of malicious activity on one or more endpoint computing devices.

FIG. 1 is a block diagram illustrating one embodiment of an exemplary system or architecture 10 consistent with the present disclosure. As shown, the system 10 includes an endpoint server 12 embodied on an internet-based computing system/service. For example, as shown, the server 12 may be embodied on a cloud-based service 14, for example. The endpoint server 12 is configured to communicate and exchange data with one or more endpoint devices 16(1)-16(n) associated with users 17(1)-17(n) over a network 18. In the present context, the users 17(1)-17(*n*) may include employees within an organization, for example. The users 17(1)-17(*n*) may further include security experts or analysts, or other users tasked with managing an organization's security posture.

The system 10 further includes one or more endpoint agents 20(1)-20(*n*) deployed to endpoint devices 16(1)-16 (*n*). As will be described in greater detail herein, the endpoint agents 20 may be configured to continuously monitor and record activity across the enterprise, specifically monitoring activity on the respective endpoint devices 16, and subsequently deliver data (i.e., event data generated as a result of monitoring) to a Logic Engine (LE), which is configured to detect and block, based on detection and response logic, any malicious processes that may otherwise invade the enterprise and cause issues. The endpoint agent 20 is configured to communicate with the endpoint server 12 and share such security data. Accordingly, the endpoint server 12, endpoint devices 16, and endpoint agents 20 are configured to communicate and share data with one another over the network 18. It should be noted that the endpoint devices 16 may be embodied as any type of device for communicating with the endpoint server 12 and cloud-based service 14, and/or other user devices over the network 18. For example, at least one of the user devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

The network 18 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected networks upon which various applications or service run including, for example, the World Wide Web). In alternative embodiments, the communication path between the endpoint devices 16, the cloud-based service 14, and the endpoint server 12, may be, in whole or in part, a wired connection.

The network 18 may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), any version of IEEE 802.11 transmission protocol standards, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

Figure 2:
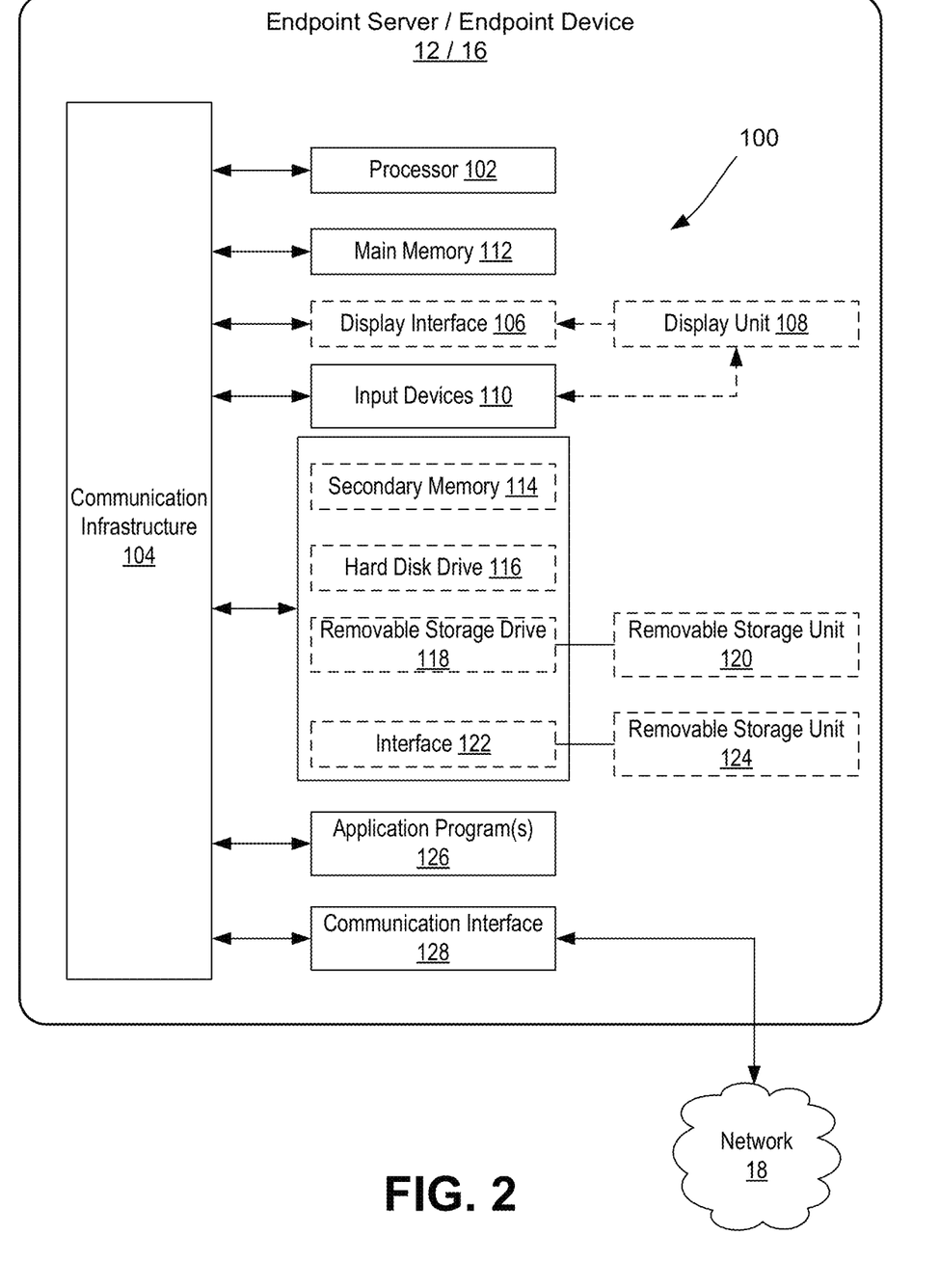
FIG. 2 is a block diagram illustrating at least one embodiment of an endpoint server or endpoint device for running endpoint security software application consistent with the present disclosure.

FIG. 2 is a block diagram illustrating at least one embodiment of an endpoint server 12 or endpoint device 16 for running endpoint security software application consistent with the present disclosure. The endpoint server 12 and/or endpoint device 16 generally includes a computing system 100. As shown, the computing system 100 includes one or more processors, such as processor 102. Processor 102 is operably connected to communication infrastructure 104 (e.g., a communications bus, cross-over bar, or network). The processor 102 may be embodied as any type of processor capable of performing the functions described herein. For example, the processor may be embodied as a single or multi-core processor(s), digital signal processor, microcontroller, or other processor or processing/controlling circuit.

The computing system 100 may further include a display interface 106 that forwards graphics, text, sounds, and other data from communication infrastructure 104 (or from a frame buffer not shown) for display on display unit 108. The computing system further includes input devices 110. The input devices 110 may include one or more devices for interacting with the endpoint server 12 or endpoint device 16, such as a keypad, microphone, camera, as well as other input components, including motion sensors, and the like. In one embodiment, the display unit 108 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the endpoint server 12 or endpoint device 16, such as accessing and interacting with applications executed on the server 12 or device 16, including the endpoint security software application.

The computing system 100 further includes main memory 112, such as random access memory (RAM), and may also include secondary memory 114. The main memory 112 and secondary memory 114 may be embodied as any type of device or devices configured for short-term or long-term storage of data such as, for example, memory devices and circuits, memory cards, hard disk drives, solid-state drives, or other data storage devices. Similarly, the memory 112, 114 may be embodied as any type of volatile or non-volatile memory or data storage capable of performing the functions described herein.

In the illustrative embodiment, the server 12 or device 16 may maintain one or more application programs, databases, media and/or other information in the main and/or secondary memory 112, 114. The secondary memory 114 may include, for example, a hard disk drive 116 and/or removable storage drive 118, representing a floppy disk drive, a magnetic tape drive, an optical disk drive, etc. Removable storage drive 118 reads from and/or writes to removable storage unit 120 in any known manner. The removable storage unit 120 may represents a floppy disk, magnetic tape, optical disk, etc. which is read by and written to by removable storage drive 118. As will be appreciated, removable storage unit 120 includes a computer usable storage medium having stored therein computer software and/or data.

In alternative embodiments, the secondary memory 114 may include other similar devices for allowing computer programs or other instructions to be loaded into the computing system 100. Such devices may include, for example, a removable storage unit 124 and interface 122. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 122, which allow software and data to be transferred from removable storage unit 124 to the computing system 100.

The computing system 100 further includes one or more application programs 126 directly stored thereon. The application program(s) 126 may include any number of different software application programs, each configured to execute a specific task. The computing system 100 further includes a communications interface 128. The communications interface 128 may be embodied as any communication circuit, device, or collection thereof, capable of enabling communications.

Computer programs (also referred to as computer control logic) may be stored in main memory 112 and/or secondary memory 114 or a local database on the server 12 or device 16. Computer programs may also be received via communications interface 128. Such computer programs, when executed, enable the computing system 100 to perform the features of the present invention, as discussed herein. In particular, the computer programs, including application programs 126, when executed, enable processor 102 to perform the features of the present invention. Accordingly, such computer programs represent controllers of computer system 100. In one embodiment where the invention is implemented using software, the software may be stored in a computer program product and loaded into the computing system 100 using removable storage drive 118, hard drive 116 or communications interface 128. The control logic (software), when executed by processor 102, causes processor 102 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 3:
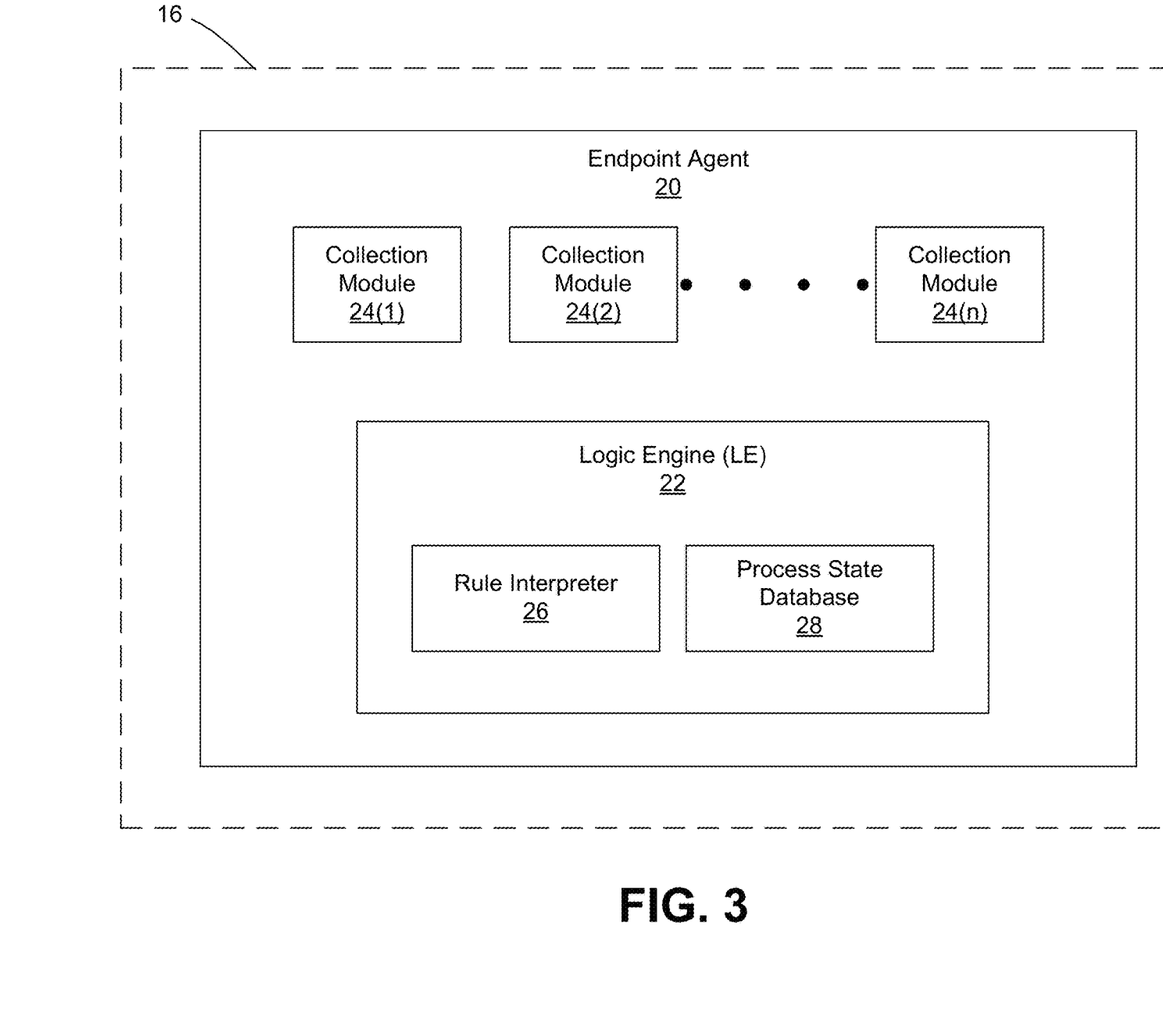
FIG. 3 is a block diagram illustrating at least one embodiment of an endpoint agent consistent with the present disclosure.

FIG. 3 is a block diagram illustrating at least one embodiment of an endpoint agent 20 consistent with the present disclosure. As shown, the endpoint agent 20 may include a Logic Engine (LE) 22 and various collection modules 24(1)-24(n) configured to monitor the activities of processes and users on the endpoint system in real time, or near-real time, through a range of kernel mode and user mode information sources. During monitoring, the collection modules are configured to generate events and deliver events to the LE 22 for subsequent threat detection and response. The events generated by the collection modules 24 are discrete packets of information that contain well-defined, highly-structured data describing a particular activity on the endpoint device 16. When collection modules 24 generate events, they deliver them in serial fashion to the LE 24.

Figure 4:
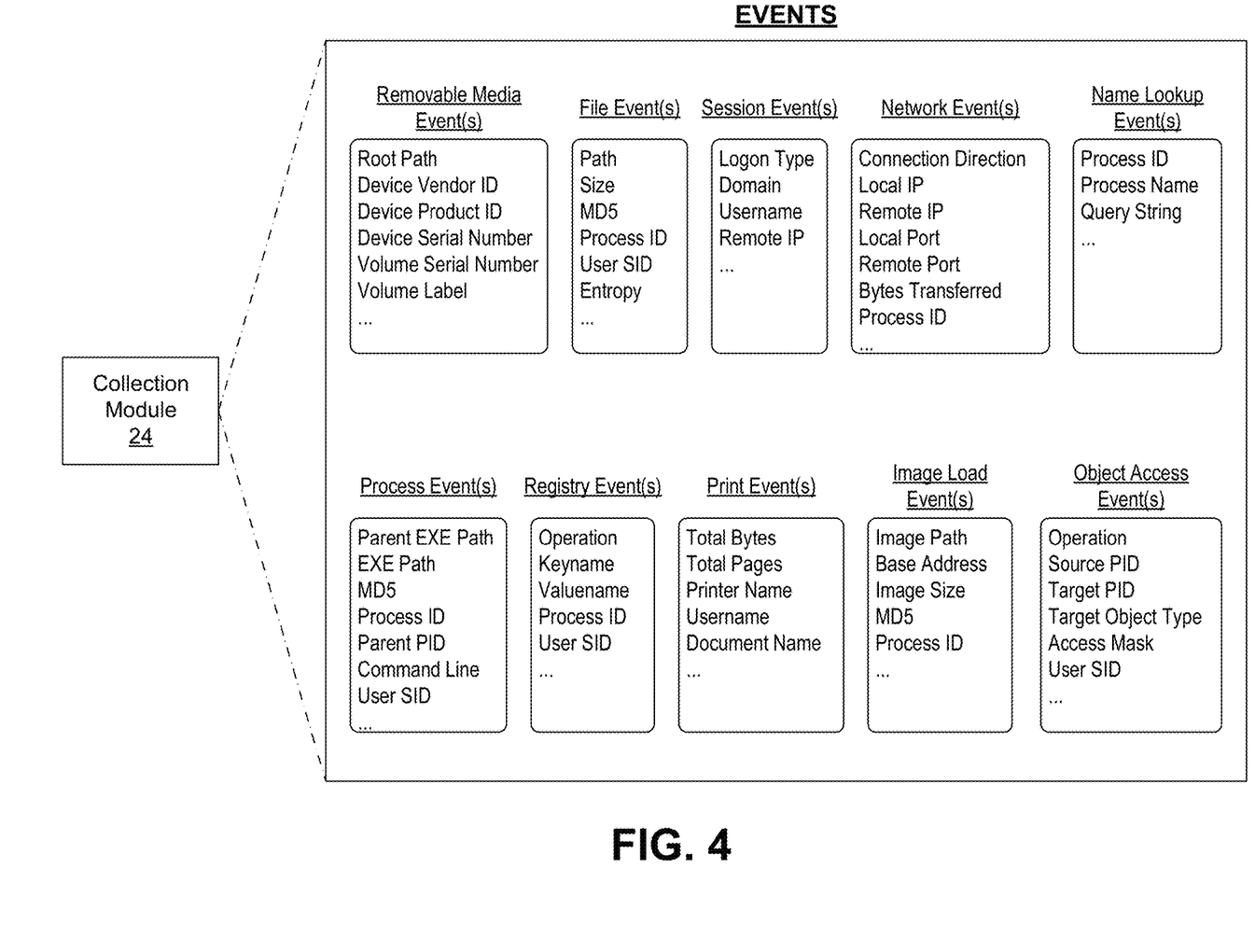
FIG. 4 is a block diagram illustrating an exemplary sampling of events generated by one or more collection modules of an endpoint agent consistent with the present disclosure.

FIG. 4 is a block diagram illustrating an exemplary sampling of events generated by one or more collection modules 24 of an endpoint agent 20 consistent with the present disclosure. Some examples of activities monitored by collection modules include process start/stop, insertion/removal of removable media, establishment/termination of network connections, writes to the file system, printing of documents, Domain Name System (DNS) name resolution attempts, and writes to the Windows registry. Each event consists of a number of named fields, called attributes, which contain data. The data contained in each attribute field conforms to a specific data type. The data types supported include character strings, unsigned 32-bit numbers, unsigned 64-bit numbers, Boolean values, IP addresses (IPv4 and IPv6), MD5 hash digests, and SHA256 hash digests.

Figure 5:
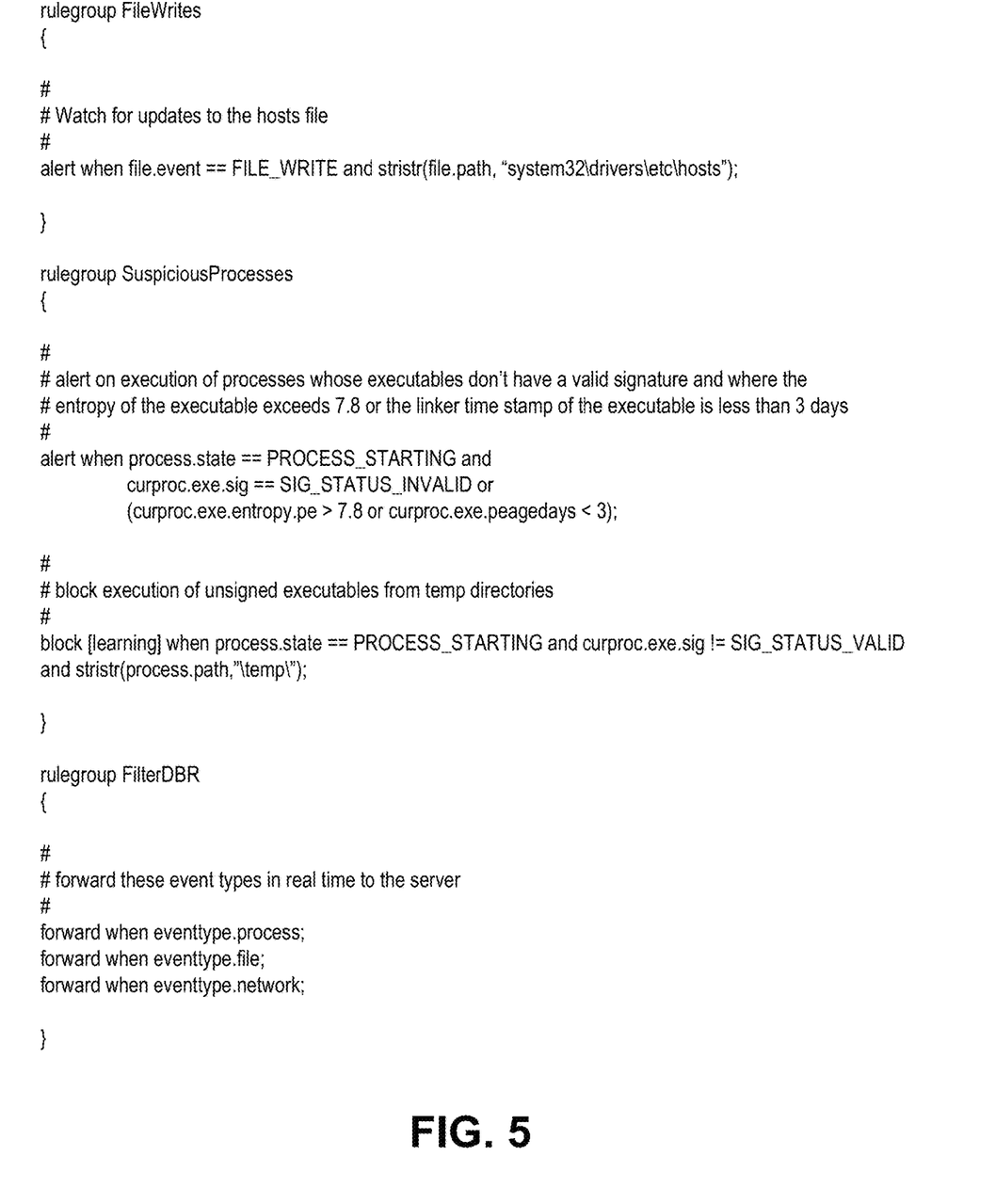
FIG. 5 is one embodiment of a rule set configured to be run on a Logic Engine (LE) consistent with the present disclosure.

The LE 22 is configured to execute logic rules against each event received from the collection modules 24. The rules executed by the LE 22 are written using a custom, declarative programming language known as Event Filtering Language (EFL). EFL is compiled into byte code using a custom compiler. This byte code can be executed by a rule interpreter 26 that resides in the LE 22 on an endpoint agent 20. The output of the EFL compiler is known as a compiled rule set. The compilation unit of the EFL compiler is a memory buffer or file that contains rules. Multiple files or memory buffers can be supplied to the compiler and compiled into a single rule set. EFL allows comments to be placed above individual rules to indicate the purpose and intent of a particular rule. In addition, individual rules can be logically grouped together into rule groups. Rule groups can be named to describe the purpose or function of the rules in that rule group. For example, a relatively simple rule set is shown in FIG. 5.

The format of a compiled rule set includes the byte codes necessary to represent the logic of each rule in binary form to the interpreter, all constant data referenced in the rules themselves (such as constant alphanumeric data referenced in rules), and metadata associated with each compiled rule. The metadata includes a copy of the text of each rule in the rule set, the comment string that immediately precedes each rule in the rule set, and a copy of the name of each rule group defined in the rule set. In addition, a mapping is placed into the compiled rule set to associate this metadata with the byte code of each rule in the compiled rule set. Including the mapping of this metadata in the compiled rule set is useful because it allows the interpreter running on an endpoint to easily retrieve contextual data about a rule when that rule is matched.

The endpoint server provides a graphical user interface (GUI) with an integrated development environment (IDE) for writing and compiling EFL rules. A compiled rule set can be embedded into an installer executable for the endpoint agent 20. When that installer is used to install an agent 20, the rules will be loaded into the LE of that agent 20. In addition, compiled rule sets can be pushed out from the endpoint server over the network to existing endpoint agent installations thereby allowing the rule sets in use on endpoint agents 20 to be updated at any time after initial installation. A rule set reload is the operation of loading a rule set into the interpreter of an endpoint agent 20. The rule set to be loaded into the interpreter by a rule set reload is called the replacement rule set. After a rule set reload completes successfully, the replacement rule set is subsequently referred to as the installed rule set.

Each rule statement in EFL contains an action and match criteria. The match criteria may include a series of Boolean logic statements, for example. If the match criteria evaluates to true (i.e., if there is a positive correlation), then the rule action is performed. The actions that can be associated with a rule include, but are not limited to, suppress, alert, forward, block, killprocess, isolate, and set.

The suppress action is used to filter data. The endpoint agent 20 will record each event generated in a forensic log file on disk, known as the Digital Behavior Recorder (DBR) log. The maximum capacity of this log is fixed, and when the log reaches capacity the oldest events in the log are overwritten with new events. To avoid filling up this forensic log with data that may have low evidentiary value suppress rules can be written. When a suppress rule matches, the associated event data is not written to the DBR log.

The forward action is used to filter the event data sent from the endpoint agent 20 to the endpoint server in order to reduce network bandwidth consumption. The forward action causes the endpoint agent 20 to send a message to the endpoint server that contains a copy of the event that matched the rule. The endpoint server may use this event data to populate real time displays of endpoint activity in the GUI console.

The alert action functions similarly to the forward action with the exception that it is used to indicate events requiring urgent attention. It causes the endpoint agent 20 to send a message to the endpoint server that contains a copy of the event that matched the rule as well as the metadata describing the logic rule that triggered the alert action. The endpoint server applies special processing to alert messages, such as displaying the alert event with special prominence in the GUI console.

The block action can be used to block a process from starting. The endpoint agent 20 receives notification of attempts to execute programs from the kernel and can therefore block such attempts based on rule criteria. When a block action occurs, the endpoint agent 20 will send a message to the endpoint server that contains a copy of the process event that matched the rule as well as the metadata describing the logic rule that triggered the block action.

The killprocess action will kill a process on the endpoint. In contrast to block, this operation is applied to processes that have already been successfully started. When a killprocess action occurs, the endpoint agent 20 will send a message to the endpoint server that contains a copy of the event that matched the rule as well as the metadata describing the logic rule that triggered the killprocess action.

The isolate action will enable network isolation for the endpoint. Isolation enables a set of firewall rules on the endpoint. The firewall rules that are enabled in response to the matching of an isolate rule are defined outside the scope of EFL.

Rule actions can also accept modifiers. An example action modifier is learning mode. When a rule with the learning mode modifier is matched, a message is sent to the endpoint server that contains a copy of the event that matched the rule, metadata describing the logic rule that triggered the action, and a flag to indicate the rule fired in learning mode. However, the action associated with the rule is not performed. Learning mode allows rule writers to safely test the behavior rules in an environment without adversely affecting the environment.

EFL also allows the declaration of variables which can be referenced in rule statements and used to track state. The set action allows the modification of state variables by a rule. Because events are sent in a serial fashion to the LE, EFL rules execute against a single event at a time. State variables make it possible to write rules that record state data in order to build a profile of user or process behavior across multiple individual events. Each variable in EFL must be declared to be of a particular data type. Basic data types include character strings, unsigned 32-bit numbers, unsigned 64-bit numbers, Boolean values, IP addresses (IPv4 and IPv6), MD5 hash digests, and SHA256 hash digests. There are also several complex types such as the set type and the threshold type. The set type is a collection of values of a single basic data type keyed by value to allow fast lookup. The threshold type is a data type that supports counting the occurrence of events and signaling the occurrence of a specified number of events within a specified time frame.

During a rule set reload, the variables declared in a compiled rule set are loaded into the Process State Database 29 on the endpoint. The process state database (PSD) 28 is an in-memory database maintained by the endpoint agent 20 that consists of a process tree, wherein an entry exists in the PSD 28 for each active process on the endpoint system, the relationship between parent and child processes is recorded in the PSD 28, and entries in the PSD 28 are uniquely identified by the process id assigned to the process by the operating system. The endpoint agent 20 updates and maintains the entries in the PSD 28. When a new process starts on the endpoint, the endpoint agent 20 adds an entry to the PSD 28 for that new process. When a process exits on the endpoint, the endpoint agent 20 removes the existing entry for that process from the PSD 28. When the endpoint agent 20 is initially started, it enumerates all existing processes and adds entries to the PSD 28 for all of those processes. The PSD 28 resides in the memory address space of the endpoint agent 20 and as such its contents are discarded when the endpoint agent process is stopped.

Each process entry in the PSD 28 is used to store a symbol table for that process. Variables declared in EFL can be defined as local variables or global variables. The values of local variables are process specific, meaning each process symbol table in the PSD 28 contains storage for the value of that variable. The values of global variables declared in EFL are shared between all processes in the PSD 28 and each process' symbol table entry for that variable simply points to a single shared instance of storage for that value.

An event may or may not have a process context associated with it. Events such as a process starting, or a process writing to a file, or process initiating a network connection are associated with specific processes. Events such as the insertion of a USB thumb drive into the system or a user logging on to a computer are not associated with a specific process and are therefore considered not to have process context. Events that have process context will include an attribute field that contains the process id. When processing an event, the LE interpreter will use the process id field in the event to identify the appropriate PSD 28 symbol table to use when resolving a variable referenced by a rule. The compiler enforces semantic rules to ensure that rule statements that reference local variables only reference event types that provide process context.

A process known as symbol table merging occurs during a rule set reload. Each process entry in the PSD 28 includes a respective symbol table. Those symbol tables must each be updated to reflect the variables defined in the replacement rule set. To do this, first a master symbol table is constructed for the replacement rule set which contains the name, data type, and initialization value of each variable declared in the replacement rule set. The replacement master symbol table is merged with the installed master symbol table to generate the new installed master symbol table. The new installed master symbol table is then propagated to the symbol tables contained in each PSD 28 process entry. The logic of merging the replacement master symbol table with the installed master symbol table to generate the new installed master symbol table is driven by the storage properties assigned to variables.

EFL variables can be declared with a storage property of persistent, non-persistent, or temporary. At the time of a rule set reload if the replacement master symbol table includes a variable of the same name and same data type as a variable that exists in the installed master symbol table, and the variable has the storage property of persistent in the installed master symbol table, then the value of that variable is copied from the installed master symbol table to the new installed master symbol table.

If no installed rule set exists at the time of rule reload, or if a variable in the replacement master symbol table does not match the name and type of one present in the installed master symbol table, or if there is a match but the variable is defined as non-persistent in installed master symbol table, then the value of that variable is copied from the replacement master symbol table to the new installed master symbol table.

The purpose for persistent variables is to make it possible to retain the state data that has been built up over time in the scenario that a rule set reload occurs. For example, the addition of new rules to the rule set should not necessarily cause the destruction and re-initialization of existing state variables that may contain important state tracking data.

Variables with a storage property of temporary do not play a role in the merging process. The value of temporary variables is reset to the initialization values contained in the installed master symbol table each time the LE processes a new event. Temporary values make it possible to track state data that is only useful during the processing of an event and which must be reset before processing the next event.

In addition to storing the variables defined in compiled rule sets, the PSD 28 also stores a number of variables that are defined and populated by the endpoint agent 20 itself. Whenever a new process starts on the endpoint system, the endpoint agent 20 will perform analysis of the executable and populate variables in the PSD 28 for that process. Examples of the data stored in these variables include the MD5 and SHA256 hashes of the executable, the signature status of an executable (signed, unsigned, signature invalid), various entropy measurements of the executable, and information relating to the shared modules and functions imported by the executable. These variables are referenced in EFL using the prefix "curproc.". Examples include "curproc.exe.sig" to reference the signature status, or curproc.exe.importlist to reference the list of imported functions in the binary. For each of these variables the prefix "curproc.parent" can be used to reference the same information for the parent of the current process, such as "curproc.parent.exe.sig".

The EFL and the rule interpreter also support the use of built-in functions to extend the functionality of EFL to support operations such as data normalization of the match criteria, operations on complex data types, or other activities that require special processing or operating system interaction that is not possible to perform in the core EFL language itself. Examples of these functions include string comparison for case sensitive and insensitive string matching and sub-string matching, file system and Windows registry path normalization, performing uppercase or lowercase transformations against a string, retrieval of a processes parent process id, manipulation set data types, and manipulation of threshold data types.

Figure 6A:
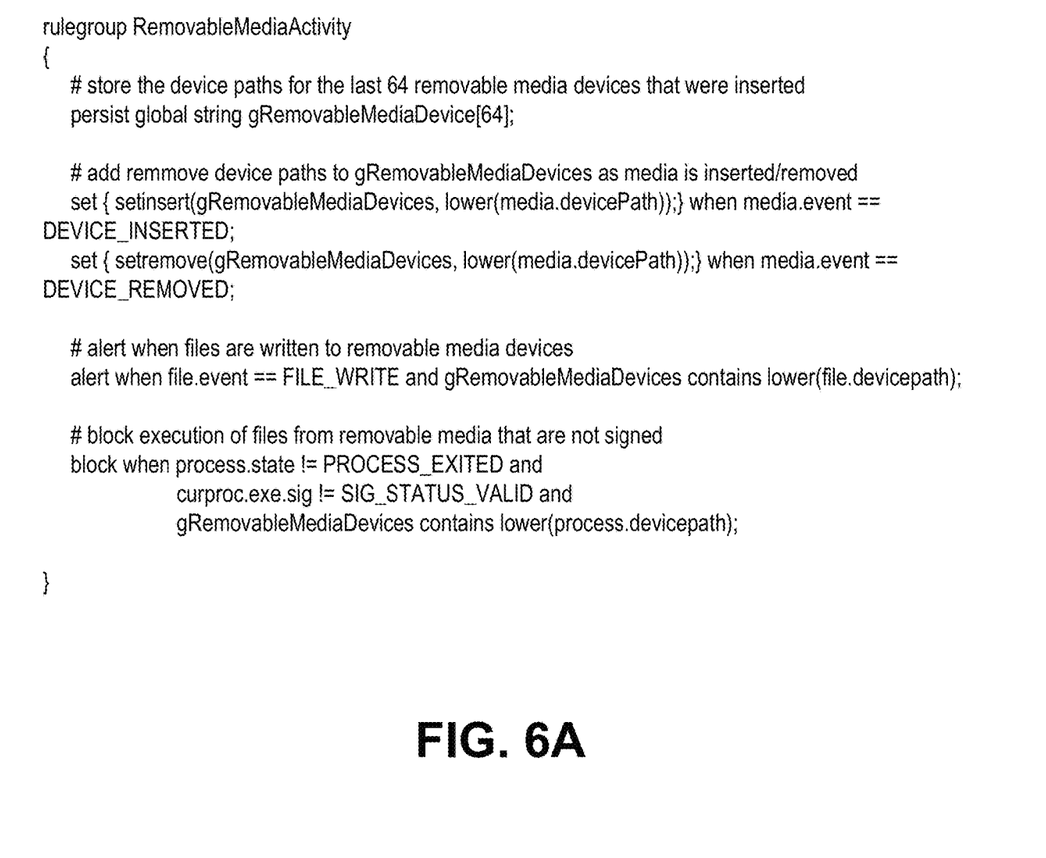
FIGS. 6A and 6B depict another embodiment of a rule set configured to be run on a LE consistent with the present disclosure.
Figure 6B:
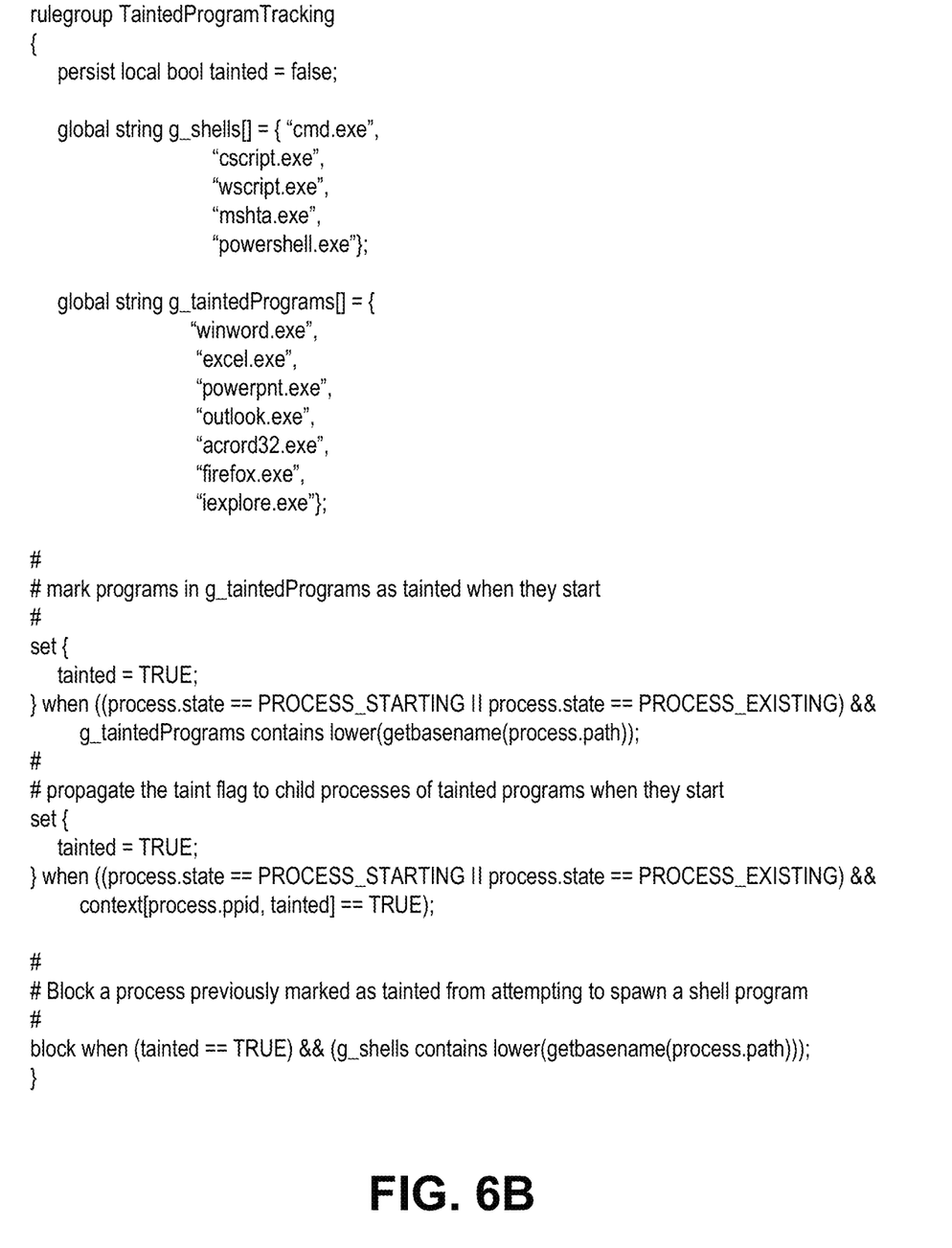

FIGS. 6A and 6B are another embodiment of a rule set configured to be run on a LE 22 consistent with the present disclosure. The rule set of FIGS. 6A and 6B is more complex and takes advantage of the PSD 28 and built-in functions.

Figure 7:
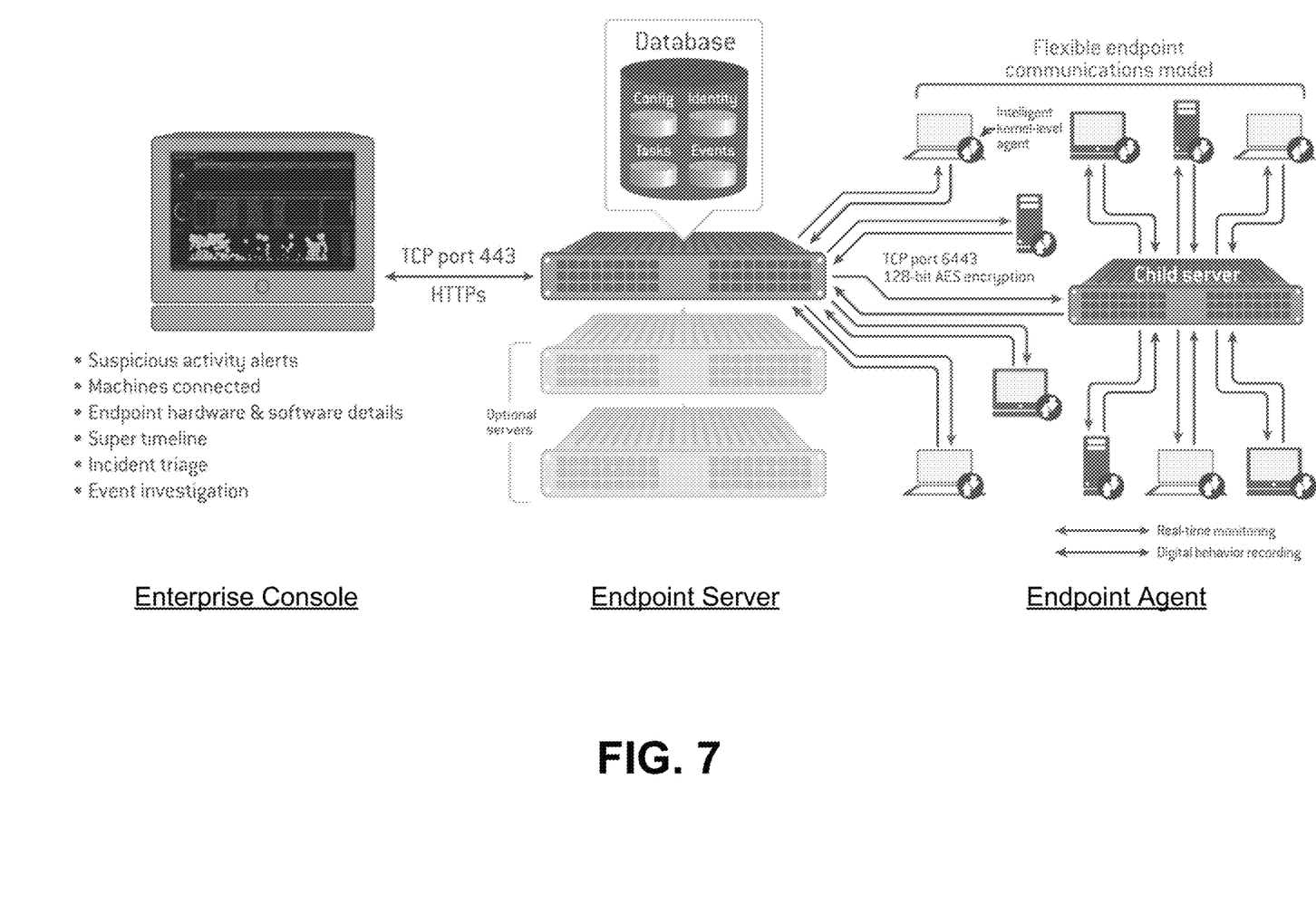
FIG. 7 is a block diagram illustrating one embodiment of system architecture, including communication between the cloud-based service, the endpoint servers, endpoint devices, and endpoint agents of the system of FIG. 1.

FIG. 7 is a block diagram illustrating one embodiment of system architecture, including communication between the cloud-based service 14, the endpoint servers 12, endpoint devices 16, and endpoint agents 20 of the system 10 of FIG. 1.

The present invention provides numerous advantages over current systems. In particular, the present invention provides an alternative approach wherein the endpoint security software exposes well-defined, highly structured data on the endpoint and exposes a well-defined, high level programming interface that can be used to manipulate the endpoint data in real time, or near-real time, on the endpoint. The present invention allows for security experts or analysts in the field to develop their own detection and response logic to operate on the endpoint to improve security detection particular to their organization. For example, the adaptive endpoint security agent architecture model allows analysts in the field to develop logic to address new emerging threats and techniques as soon as they are encountered, address threats unique to a particular customer environment, address security policies or business practices unique to a particular customer organization, aid in specific investigations and incident response efforts, and filter out data collected on the endpoint that may have low evidentiary value in order to reduce the amount of data transmitted outside of the endpoint for storage or further analysis. In short, the present invention allows for analysts to expand the effectiveness of the endpoint security software by developing detection and response logic that makes use of the data collected by the endpoint in ways not conceived of by the vendor of the endpoint security software.

The adaptive endpoint security agent architecture model further provides at least the following key benefits: continuous defense of the enterprise from known and unknown threats with real-time detection; closes feedback loop between sensing, filtering, detecting, and disrupting; delivering of additional protection and prevention capabilities that traditional endpoint security solutions don't offer; reduces workload by automating repetitive threat detection and response workflows; lowers the attack surface and reduces associated risk; provides user with control of their enterprise and the data that resides on endpoints; replaces the need for various point solutions and eliminates associated costs; and increases productivity across endpoints by removing the need for multiple agents that slow down performance.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A system for providing an integrated, context-aware, security management framework for an enterprise, the system comprising:
   one or more endpoint devices, each endpoint device comprising a deployed endpoint agent configured to continuously monitor and record activity on the respective endpoint device and further execute one or more sets of detection and response logic rules for managing the detection of, and response to, any activity associated with the respective endpoint device that poses a potential security threat to the enterprise; and
   a server configured to communicate and exchange data with the one or more endpoint devices over a network, the server comprising a hardware processor coupled to non-transitory, computer-readable memory containing instructions executable by the processor to cause the server to:
      provide a security management platform comprising an interface with which an authorized user associated with the enterprise can interact to monitor endpoint agent activity and manage, in real time, or near-real time, functionality of at least one endpoint agent deployed on one of the one or more endpoint devices;
      provide an integrated development environment (IDE) operably coupled to the interface;
      receive, from the authorized user via the interface, input comprising custom, declarative programming language input to the IDE to write, develop, and/or modify, on-the-fly, one or more customized sets of detection and response logic rules to be executed by an endpoint agent; and
      output, to the endpoint agent, a customized set of detection and response logic rules.

2. The system of claim 1, wherein the server is configured to receive, from the endpoint agent, security data based on execution of one or more sets of detection and response logic rules.

3. The system of claim 2, wherein the endpoint agent comprises one or more collection modules configured to monitor activities of processes and user on the respective endpoint device in real time, or near-real time, via a range of kernel mode and/or user mode information sources.

4. The system of claim 3, wherein the one or more collection modules are configured to:
   generate event data based on the monitoring of activities; and
   transmit the event data to a logic engine of the endpoint agent to undergo analysis based on execution of detection and response logic rules for the determination of a one or more actions to be performed based on the analysis of the event data.

5. The system of claim 4, wherein the activities comprise one or more events selected from the group consisting of removable media events, file events, session events, network events, name lookup events, process events, registry events, print events, image load events, and object access events.

6. The system of claim 5, wherein the one or more events are selected from the group consisting of process start/stop, insertion/removal of removable media, establishment/termination of network connections, writes to a file system, printing of one or more documents, Domain Name System (DNS) name resolution attempts, and writes to an operating system registry.

7. The system of claim 4, wherein the set of detection and response logic rules comprises at least one rule statement comprising match criteria and an associated action.

8. The system of claim 7, wherein the analysis comprises:
   comparing the event data with the match criteria; and
   determine an associated action to be performed by the endpoint agent based on a positive
   correlation of the event data with the match criteria.

9. The system of claim 8, wherein the associated action is selected from the group consisting of a suppress action, an alert action, a forward action, a block action, a killprocess action, an isolate action, and a set action.

10. The system of claim 9, wherein the suppress action comprises preventing recording of event data to a forensic log file in a database based on a positive correlation of the event data with a suppress rule match criteria.

11. The system of claim 9, wherein the alert action comprises transmitting an alert to the endpoint server indicative of event data requiring attention based on a positive correlation of the event data with an alert rule match criteria.

12. The system of claim 9, wherein the forward action comprises transmitting a communication to the endpoint server comprising a copy of event data based on a positive correlation of the event data with a forward rule match criteria.

13. The system of claim 9, wherein the block action comprises blocking execution of a process associated with event data based on a positive correlation of the event data with a block rule match criteria.

14. The system of claim 9, wherein the killprocess action comprises terminating a process associated with event data and having already been executed based on a positive correlation of the event data with a killprocess rule match criteria.

15. The system of claim 9, wherein the isolate action comprises isolating, over the network, the endpoint agent and endpoint device from other endpoint agents and endpoint devices.

16. The system of claim 9, wherein the set action comprises modifying one or more state variables associated with rule statements of matching criteria.

17. The system of claim 1, wherein the one or more customized sets of detection and response logic rules are generated based on a custom, declarative programming language, wherein the custom, declarative programming language is compiled, via a compiler module, into byte code, wherein the compiler module is configured to output a compiled rule set.

18. The system of claim 17, wherein the customized set of detection and response logic rules outputted from the server comprises a compiled rule set embedded into an installer executable by the endpoint agent to thereby transmit the compiled rule set to the endpoint agent such that the endpoint agent executes the associated customized set of detection and response logic rules.

19. The system of claim 1, wherein the authorized user is an individual or group tasked with managing the enterprise's security posture and the enterprise comprises at least one of a business entity, company, organization, and government agency.

20. The system of claim 1, wherein the customized set of detection and response logic rules is based on at least one of the enterprise's operations, the enterprise's infrastructure, user-based processes within the enterprise, the enterprise's security policies, industry-specific rules and regulations associated with the enterprise, known security threats and techniques, and new emerging security threats and techniques.

\* \* \* \* \*